United States Patent [19]
Chen

[11] Patent Number: 6,031,317
[45] Date of Patent: Feb. 29, 2000

[54] PIEZOELECRIC SHOCK SENSOR

[75] Inventor: Steven Chien-Young Chen, Derwood, Md.

[73] Assignee: Aeptec Microsystems, Inc., Rockville, Md.

[21] Appl. No.: 08/931,833

[22] Filed: Sep. 17, 1997

[51] Int. Cl.$^7$ ................................................. H01L 41/08
[52] U.S. Cl. ...................... 310/329; 310/339; 310/358; 310/360
[58] Field of Search .................... 310/329, 339, 310/319, 360, 361, 358, 331, 321; 73/517 R, 654, 35, 514 R, 516 R, 505; 360/75

[56] References Cited

U.S. PATENT DOCUMENTS

| | | | |
|---|---|---|---|
| 3,566,163 | 8/1968 | Zolliderberg et al. | 310/8.3 |
| 3,739,202 | 6/1973 | Cady | 310/329 |
| 4,317,059 | 2/1982 | Besson | 310/361 |
| 4,344,010 | 8/1982 | Vig et al. | 310/361 |
| 4,365,182 | 12/1982 | Ballato et al. | 310/361 |
| 4,410,822 | 10/1983 | Filler | 310/361 X |
| 4,573,362 | 3/1986 | Amlani | 73/862.04 |
| 4,791,617 | 12/1988 | Seymour | 310/329 X |
| 4,839,872 | 6/1989 | Gragnolati et al. | 310/329 X |
| 4,862,298 | 8/1989 | Genheimer et al. | 360/60 |
| 4,902,926 | 2/1990 | Engel et al. | 310/329 X |
| 5,235,472 | 8/1993 | Smith | 360/60 |
| 5,373,213 | 12/1994 | Smith | 310/355 |
| 5,389,850 | 2/1995 | Wilmer | 310/329 |
| 5,452,612 | 9/1995 | Smith et al. | 73/514.34 |
| 5,512,794 | 4/1996 | Kubler et al. | 310/329 |
| 5,515,725 | 5/1996 | Tabota et al. | 310/321 X |
| 5,521,772 | 5/1996 | Lee et al. | 360/75 |
| 5,539,270 | 7/1996 | Kaji et al. | 310/329 |
| 5,763,982 | 6/1998 | Tabota et al. | 310/329 |

FOREIGN PATENT DOCUMENTS

| | | |
|---|---|---|
| 0538976 | 4/1993 | European Pat. Off. |
| 0655736 | 5/1995 | European Pat. Off. |
| 934022C | 2/1942 | Germany |
| 19537546 | 4/1997 | Germany |
| 63-282973 | 11/1988 | Japan |
| 1287470 | 11/1989 | Japan |
| 6275002 | 9/1994 | Japan |
| 2292762 | 3/1996 | United Kingdom |

OTHER PUBLICATIONS

J. Tabota, "Two–End Clamp Structure Enhances Characteristics in SMD Shock Sensors", JEE, Aug. 1994 pp. 63–66.

*Primary Examiner*—Mark O. Budd
*Attorney, Agent, or Firm*—Baker & Botts, L.L.P.

[57] ABSTRACT

A shock sensor sensitive to linear shocks along two axes and to rotational shocks in a given plane and comprised of two piezoelectric sensors and an integrated circuit is disclosed. The first piezoelectric sensor is polarized in a direction that is angularly offset from a plane in which the shock sensor lies and produces a first response to shocks having components along a first and a second orthogonal axis that define a plane perpendicular to the plane in which the shock sensor lies. The second piezoelectric sensor is polarized in a direction that is angularly offset from the plane in which the sensor lies and that is angularly offset 180° from the first direction. The second piezoelectric sensor produces a second response to shocks having components along the first and second orthogonal axis. The integrated circuit is responsive to the first and second responses and produces a signal indicating a linear shock and a signal indicating a rotational shock by combining the first and second responses.

23 Claims, 4 Drawing Sheets

PIEZOELECRIC SHOCK SENSOR

TECHNICAL FIELD OF THE INVENTION

This invention relates generally to shock sensors. More specifically, this invention relates to a shock sensor capable of sensing shocks along a number of axes using a number of piezoelectric sensors lower than the number of axes.

BACKGROUND OF THE INVENTION

An active material is any material which responds electrically (e.g., produces a charge) to a mechanical stimulus (e.g., a mechanical stress or strain), or conversely which responds mechanically (e.g., produces a mechanical deformation) to an electrical stimulus (e.g., voltage, current or electric field). Active materials are also referred to as induced strain actuators and may be, for example, piezoelectric materials, electrostrictive materials, piezoresistive materials, shape memory materials or magnetostrictive materials. Thus, active materials, such as piezoelectric materials are well suited for use as sensors to detect mechanical disturbances, e.g., shocks, forces and pressures. Shock sensors have application in a number of industries, e.g., the automotive industry as sensors for air bag deployment, and the computer industry as sensors to detect shocks to disk drives and input pens.

According to their application, shock sensors are expected to detect various types of shocks. Generally, shocks can be decomposed into translational components and rotational components. A linear shock is defined as a shock having only translational components. A rotational shock is defined as a shock having only rotational components. Both linear and rotational shocks can be decomposed with respect to the three cartesian coordinate axes. Most shocks are a combination of linear and rotational shock.

Conventional shock sensors suffer from a number of drawbacks. Many conventional sensors only detect shocks along or about a number of axes equal to the number of sensors employed. For example, such a conventional shock sensor is disclosed in U.S. Pat. No. 5,521,772 issued to Lee et al. Lee et al. disclose a data disk drive including an acceleration rate sensor 50 for controlling or modifying the operation of the disk drive. Sensor 50 includes two piezoelectric transducers 52 and 54 separated by a stainless steel block 51. Block 51, transducers 52 and 54 and seismic mass plates 56 and 58 together form sensor 50. Sensor 50 is sensitive to shocks along only two axes. That is, sensor 50 is sensitive to linear shocks along the primary sensitive axis (i.e., the polling direction β) of the two transducers (col. 6, lines 1–7) and to rotational shocks in the plane of the sensor (col. 5, lines 59–67). The response produced by sensor 50 is a result of mechanical stress acting on transducers 52 and 54 through flexion of sensor 50 about its sensitive axis.

U.S. Pat. No. 5,452,612 issued to Smith et al. discloses an accelerometer 10 having a beam-type transducer structure b 22. Transducer 22 includes a polarized piezoelectric sensor 59 and two sensing areas defined by output electrodes 57 and 58 (FIGS. 7–9). Transducer 22 is sensitive to shocks along two linear axes and one rotational axis (col. 6, lines 9–18). In order to achieve this three-axis sensitivity with two sensing areas, Smith et al. manufacture transducer 22 with an upward slant with respect to the plane in which the sensor lies in order to achieve sensitivity along an additional linear axis.

U.S. Pat. Nos. 5,235,472 and 5,373,213 issued to Smith disclose shock load detection devices 24 having a transducer subassembly 25 very similar to that disclosed by Smith et al. In addition to manufacturing transducer subassembly 25 with a particular orientation, Smith mounts detection device 24 in a particular orientation on the printed circuit board. This complex manufacturing and mounting scheme enables sensitivity to both torsional and linear forces in three mutually perpendicular directions (FIG. 3 and col. 4, lines 56–63).

Although the transducers disclosed by Smith et al. and Smith enable sensing along multiple axes, they have various drawbacks as compared to other piezoelectric sensing mechanisms. Specifically, the slanted beam-type structure is difficult to manufacture.

SUMMARY OF THE INVENTION

Therefore, a need has arisen for a shock sensor that is responsive to shocks along multiple axes and simple to manufacture and use.

A shock sensor according to one embodiment of the invention is sensitive to linear shocks along two orthogonal axes and rotational shocks in the plane in which the shock sensor lies. The shock sensor comprises a first piezoelectric sensor polarized in a first direction angularly offset from the plane in which the shock sensor lies. The first piezoelectric sensor produces a first response to shocks having components along a first and a second orthogonal axis which define a plane perpendicular to the plane in which the shock sensor lies. A second piezoelectric sensor is polarized in a second direction angularly offset from the plane in which the shock sensor lies and angularly offset 180° from the first direction. The second piezoelectric sensor produces a second response to shocks having components along the first and second orthogonal axis. An integrated circuit is responsive to the first response and second response and produces at least three signals. A first signal indicates a linear shock to the shock sensor, sensed by the first piezoelectric sensor. A second signal indicates a linear shock to the shock sensor, sensed by the second piezoelectric sensor. A third signal indicates a rotational shock to the shock sensor and is derived by combining the first response and the second response. In a preferred embodiment, the first and second piezoelectric sensors operate in shear mode.

According to another embodiment of the invention, a method of sensing a shock is disclosed. The method comprises generating a first signal capable of indicating a shock along two orthogonal axes using a first piezoelectric sensor having a first primary axis in a first direction. A second signal capable of indicating a shock along the two orthogonal axes is then generated using a second piezoelectric sensor. The second piezoelectric sensor has a second primary axis in a second direction angularly offset 180° from the first direction. The method next generates a first output signal and a second output signal in response to the first and the second signal. The first output signal is representative of a linear shock along the two orthogonal axes. The second output signal is representative of a rotational shock in a plane perpendicular to the plane defined by the two orthogonal axes and is generated by combining the first signal and the second signal.

The above-described embodiments of the present invention provide technical advantages over conventional shock sensors. For example, the shock sensor and the method for sensing shocks according to the above-described embodiments of the present invention provide sensitivity along multiple axes with minimal sensor complexity. The shock sensors according to the above-described embodiments do not require complicated manufacturing fixtures or tooling for assembly (as is required when one or more of the sensors is positioned at an angle slanted from the plane in which the shock sensor lies). Other technical advantages are apparent to one skilled in the art from the following figure, description and claims.

BRIEF DESCRIPTION OF THE DRAWINGS

The features and objects of the present invention, and the manner of attaining them is explained in detail in the following DETAILED DESCRIPTION OF THE INVENTION when taken in conjunction with the accompanying drawing wherein.

DETAILED DESCRIPTION OF THE INVENTION

A shock sensor and a method for sensing shocks according to the present invention enable detection of shocks along multiple axes using a sensor structure that is simple to manufacture and use. More specifically, a shock sensor and method of sensing shocks according to one embodiment of the present invention enable detecting linear shocks along two orthogonal axes and rotational shocks in a plane using two piezoelectric sensors operating in the shear mode and polarized in different directions.

Figure 1:
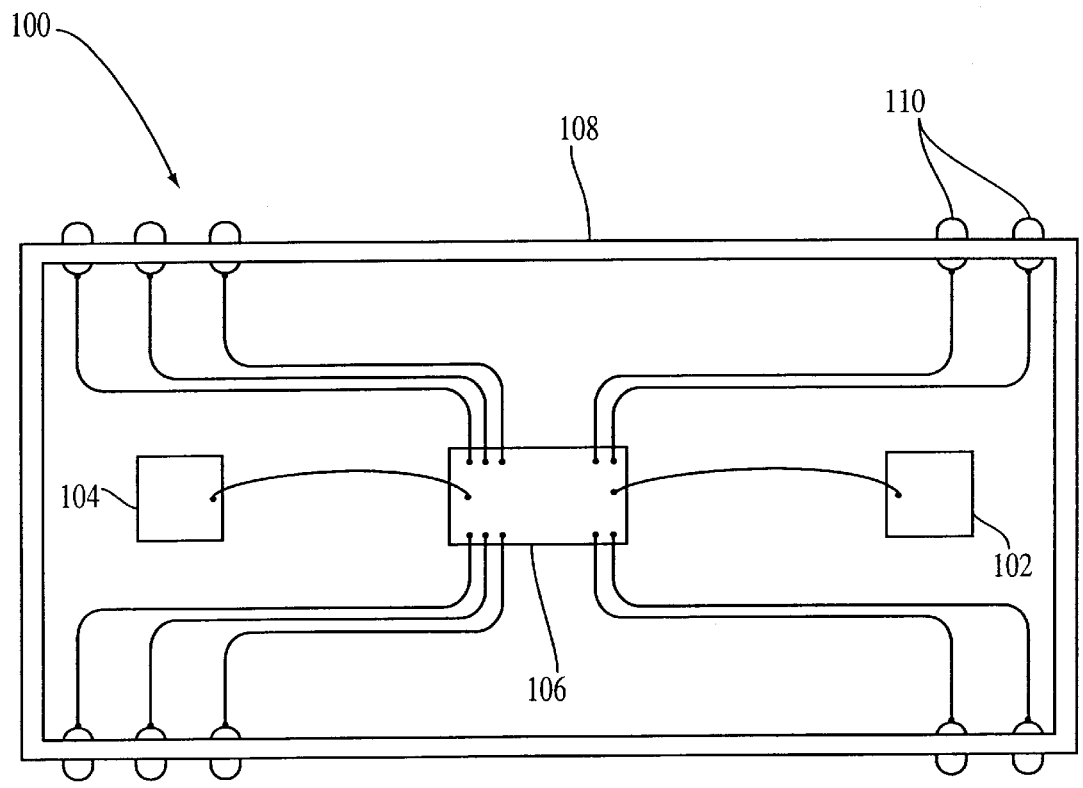
FIG. 1 schematically depicts a shock sensor according to one embodiment of the present invention.
Figure 1:
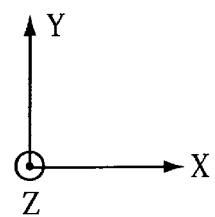

FIG. 1 schematically depicts a top view of shock sensor 100 according to one embodiment of the present invention. As is explained below, shock sensor 100 is capable of detecting linear shocks directed along the Y and Z axes (see coordinate system in figure) and rotational shocks in the XY plane (i.e., the plane in which shock sensor 100 lies) or the XZ plane. Shock sensor 100 comprises a first piezoelectric sensor 102, a second piezoelectric sensor 104 and an integrated circuit 106 disposed within package 108. Piezoelectric sensors 102 and 104 are mounted within package 108 according to any known technique. Piezoelectric sensors 102 and 104 and integrated circuit 106 are interconnected using any known technique, for example, wire bonding. Package 108 may be any type of package within which piezoelectric sensors 102 and 104 and integrated circuit 106 may be disposed for easy mounting, for example on a printed circuit board. Package 108 may comprise any type of package, for example, a ceramic or plastic leaded package (DIP or SIP) or a ball grid array.

Figure 2:
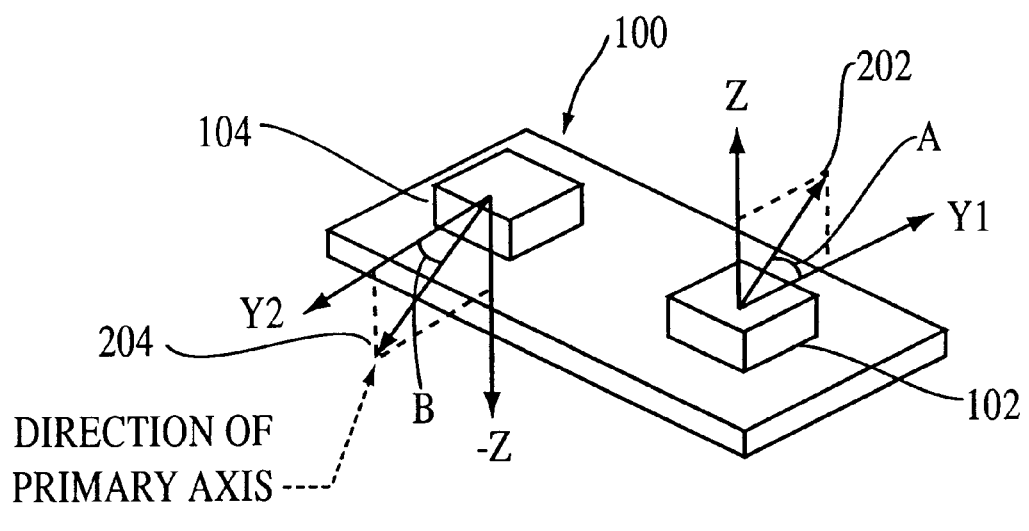
FIG. 2 depicts a simplified diagram of the shock sensor showing polarization of the piezoelectric sensors according to one embodiment of the present invention.

FIG. 2 depicts a simplified view of piezoelectric sensors 102 and 104 and their primary sensitive axes, i.e., the directions in which they are polarized. FIG. 2 also shows an XYZ coordinate system for reference purposes. As can be seen from FIG. 2, shock sensor 100 lies generally in the XY plane, piezoelectric sensor 102 has a primary axis 202 and piezoelectric sensor 104 has a primary axis 204. Primary axis 202 is disposed generally within a plane defined by orthogonal axes Y1 and Z and is angularly offset at an angle A from the XY plane, i.e., the plane within which shock sensor 100 lies. Primary axis 204 is disposed generally within a plane defined by orthogonal axes Y2 and −Z and is angularly offset at an angle B from the XY plane. It should be noted that the axes Y1 and Y2 are generally parallel to the Y coordinate axis. Therefore, the two planes in which the primary axes lie, i.e., the plane defined by Y1 and Z and the plane defined by Y2 and −Z, are generally perpendicular to the XY plane. According to embodiments of the present invention, primary axis 202 and primary axis 204 are also angularly separated by 180° in the YZ plane. That is, angle A is equal to angle B. In one embodiment, A=B≈25°.

Because piezoelectric sensors 102 and 104 are polarized in a direction which is angularly offset from the XY plane, they are capable of responding to linear shocks having components along both the Y axis and the Z axis. This is in contrast to conventional piezoelectric sensors that are typically polarized in a direction parallel to one of the coordinate axes and thus respond to linear shocks having components along only that one axis unless some complex mounting scheme is used. This unique polarization scheme also enables shock sensor 100 to detect the existence of a rotational shock in the XY plane by combining a response generated by piezoelectric sensor 102 with a response generated by piezoelectric sensor 104. For example, if shock sensor 100 experiences a rotational shock in the XY plane, piezoelectric sensor 102 will detect some component along axis Y1 and piezoelectric sensor 104 will detect some component along axis Y2. The magnitudes of these Y components, however, will be different. This difference represents the rotational component in the XY plane. In one preferred embodiment, the responses generated by piezoelectric sensors 102 and 104 are simply added to derive the rotational component. For a rotational shock in the XY plane, the linear shock components along the Z axis are equal and opposite and therefore will cancel when the responses generated by sensors 102 and 104 are added because the Z components of the polarizations are 180° out of phase.

A rotational shock in the XZ plane could also be detected in a similar fashion. That is, in response to a rotational shock in the XZ plane, sensors 102 and 104 produce responses whose Y components cancel when added because the Y components of the polarizations are 180° out of phase. Thus, after adding, the difference between the Z component of the responses of sensors 102 and 104 would remain. This difference is representative of rotation in the XZ plane. In one embodiment, shock sensor 100 is used to detect shocks applied to a hard disk drive in a laptop computer. In this environment, the main types of shocks to be detected are linear shocks along the Y and Z axes and rotational shocks in the XY plane (assuming that the laptop lies generally in the XY plane and that the Y axis point directly toward the user). That is, a laptop would not generally rotate in the XZ plane. Nevertheless, in other embodiments, for example deploying airbags in an automobile or for a computer input pen, the ability of shock sensor 100 to detect rotations in the XY and XZ planes may be useful.

Piezoelectric sensors 102 and 104 can be formed from any of a number of piezoelectric materials such as, lead zirconate titanate, barium titanate, and polyvinyledene fluoride. In a preferred embodiment, piezoelectric sensors 102 and 104 are formed from piezoelectric ceramic PZT5A. Piezoelectric sensors 102 and 104 are preferably polarized in particular directions as is explained in detail in conjunction with FIG. 2. Piezoelectric sensors 102 and 104 are polarized according to any known polarization technique. Briefly, in one embodiment, piezoelectric sensors 102 and 104 are polarized by subjecting the piezoelectric material to a high intensity electric field. The electric field operates to produce a relative displacement of bound positive and negative charges within the material.

In one preferred embodiment, piezoelectric sensors 102 and 104 are shear mode sensors. That is, sensors 102 and 104 produce an electrical response to a shear stress. There are three basic piezoelectric sensing mechanisms. A shear mode sensor produces an electrical response to a shear stress. A compression mode sensor generally produces an electrical response to a compresive or tensile force. While compression mode sensors are within the scope of the claims of the present invention, they are not preferred for embodiments of the present invention. A beam type sensor generally produces an electrical response to a force which causes flexion of the beam about its axis. U.S. Pat. Nos. 5,452,612, 5,373,213 and 5,235,472 discussed in the background employ beam-type sensor configurations. Beam-type sensors are within the scope of the claims of the present invention, they are also not preferred for embodiments of the present invention.

Integrated circuit 106 is operative to receive signals from piezoelectric sensors 102 and 104 and produce both analog and digital outputs that are representative of a shock at leads 110 of package 108. That is, the analog and digital outputs from integrated circuit 106 provide an indication of the linear and rotational components existing in a shock. The outputs can be used, for example, to control reading and writing to a hard disk drive, or deployment of an airbag in an automobile. Although shock sensor 100 is shown in FIG. 1 with integrated circuit 106 disposed within package 108, the invention is not so limited. The operations performed by integrated circuit 106 could be performed using circuit components mounted directly on a printed circuit board or an arithmetic logic unit or any suitable analog or digital processor.

Figure 3:
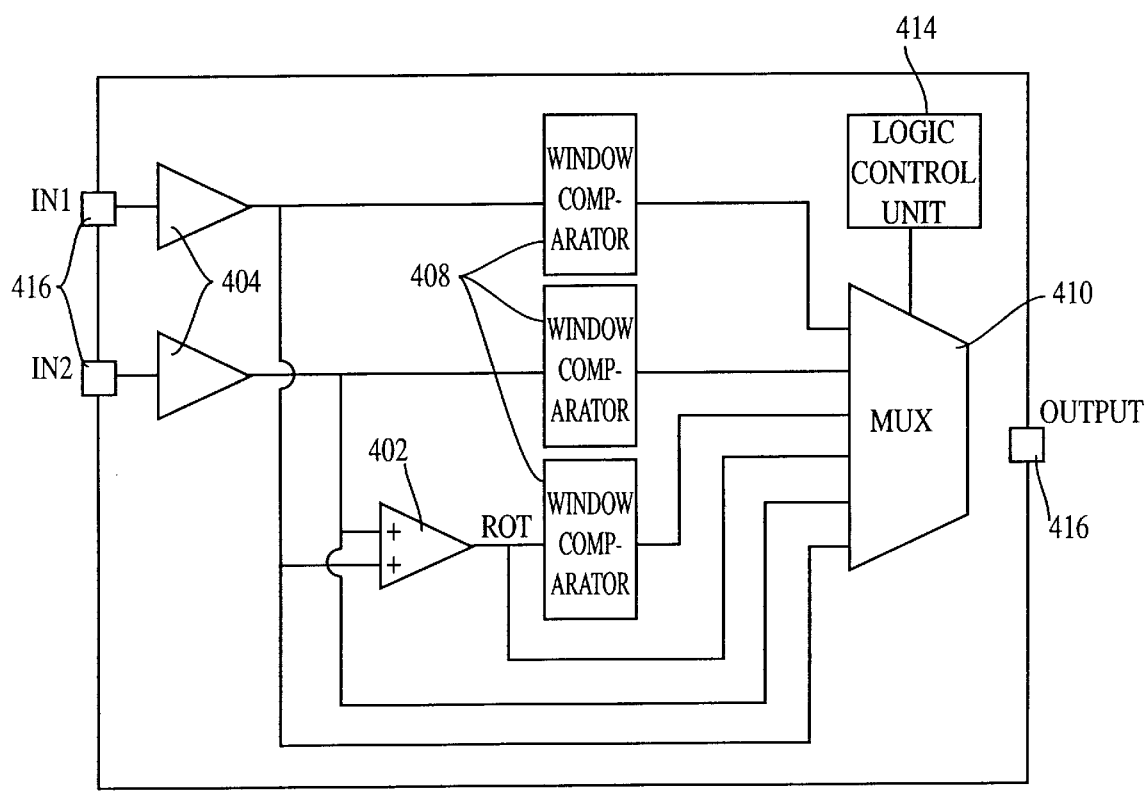
FIG. 3 depicts a simplified block diagram of an integrated circuit associated with the sensor according to one embodiment of the present invention.

FIG. 3 shows one embodiment of a circuit 400 for accomplishing the operations of integrated circuit 106. Circuit 400 is directed to the use of shock sensor 100 to detect shocks to a hard disk drive in a laptop computer. The initial stage of circuit 400 comprises input amplifiers 404 and adder amplifier 402. In FIG. 3, the output of piezoelectric sensor 102 is indicated by IN1 and the output of piezoelectric sensor 104 is indicated by IN2. Input amplifiers 404 sense, amplify and filter the high-impedance signal delivered by piezoelectric sensors 102 and 104. Adder amplifier 402 operates on the outputs of amplifiers 404 to derive a signal, ROT, representative of the rotational component in the XY plane (or the XZ plane). Window comparators 408 digitize the outputs of amplifiers 402 and 404 in a conventional manner. Multiplexor 410 is controlled by logic control unit 414 and performs typical multiplexing among all digital and analog signals. Multiplexor 410 may have more than one analog and digital output. Contact points 416 arranged around the outside of circuit 400 represent contact points for inputs and outputs to circuit 400.

The embodiments of the present invention are not limited to the polarization scheme described above. According to another embodiment, the polarization scheme for piezoelectric sensors 102 and 104 is altered such that the Z component of primary axis 204 is inverted so that primary axis 204 is disposed within a plane defined by orthogonal axes Y2 and Z. Using this polarization scheme, adder amplifier 402 of integrated circuit 106 is replaced with a differential amplifier in order to retain the functionality described in conjunction with FIG. 3.

Figure 4:
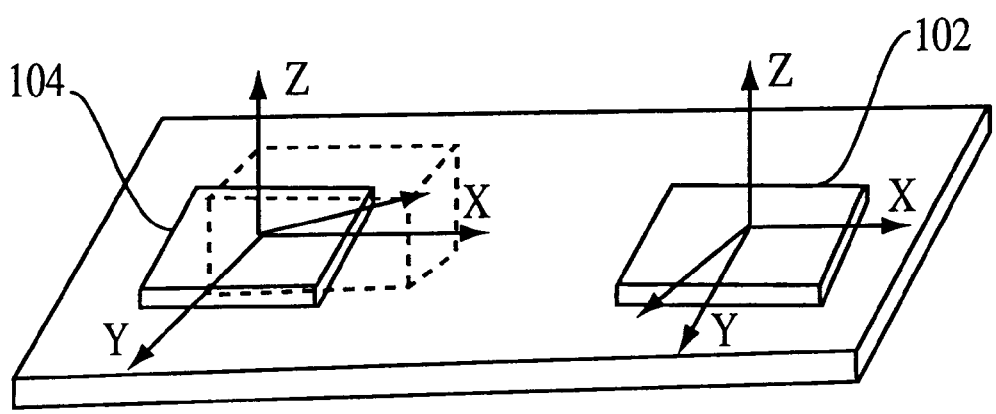
FIG. 4 depicts a simplified diagram of the shock sensor showing polarization of the piezoelectric sensors according to another embodiment of the present invention.

According to another embodiment, the unique polarization scheme according to preferred embodiments of the present invention can be extended to three dimensions. For example, as shown in FIG. 4, the primary sensitive axes for piezoelectric sensors 102 and 104 have non-zero components in the X, Y, and Z directions.

According to another embodiment, the present invention provides a method of sensing a shock applied to an object. The method can be performed by a sensor such as shock sensor 100 explained above but is not structurally limited thereby. The method comprises an initial step of generating a first signal capable of indicating a shock along two orthogonal axes. This initial step is carried out using a first piezoelectric sensor having a first primary axis in a first direction. In one embodiment, the first piezoelectric sensor is preferably piezoelectric sensor 102 shown in FIGS. 1 and 2. In a second step, a second signal capable of indicating a shock along the two orthogonal axes is generated. This second signal is generated using a second piezoelectric sensor having a second primary axis in a second direction. The second primary axis is preferably angularly offset 180° from the first primary axis in the plane defined by the two orthogonal axes. In one embodiment, the second piezoelectric sensor is preferably piezoelectric sensor 104 shown in FIGS. 1 and 2.

Once the first and second signals are generated, a group of secondary output signals are generated from the first and second signals. A first and second secondary output signal are both representative of a linear shock along the two orthogonal axes. This first secondary output signal is generated by processing the first signal to provide particular signal characteristics without changing the character of the information conveyed by the first signal. For example, the first signal may be buffered, filtered and amplified in order to generate the first secondary output signal. The second secondary output signal is generated from the second signal in the same way that the first secondary output signal was generated from the first signal. In one embodiment, the first and second secondary output signals are then digitized in a manner which is known in the art to develop first and second digital linear output signals.

Next, a third secondary output signal is generated by combining the first signal and the second signal. The third secondary output signal is representative of a rotational shock in a plane perpendicular to a plane defined by the two orthogonal axes. Because of the manner in which the first and second signal are formed, when the first and second signal are added, the components along one of the two axes will cancel. The signal that remains will indicate the difference between the components along the second of the two orthogonal axes and will be indicative of a rotational shock. In one embodiment, the two orthogonal axes are the Y axis and the Z axis as indicated in FIGS. 1 and 2. In this embodiment, the method will detect rotational shocks in either the XY plane or the XZ plane. In another embodiment, the rotational output signal is digitized in a manner which is known in the art to develop a digital rotational output signal.

A shock sensor and method for sensing shocks according to the present invention, provide a number of technical advantages over conventional sensors and methods. For example, the shock sensor and the method for sensing shocks according to the above-described embodiments of the present invention provide sensitivity along multiple axes with minimal sensor complexity.

Although the present invention has been described in detail, it should be understood that various changes, substitutions, and alterations can be made without departing from the intended scope as defined by the appended claims.

What is claimed is:

1. A shock sensor sensitive to linear shocks along two orthogonal axes and to rotational shocks in a plane in which the shock sensor lies comprising:

a first piezoelectric sensor polarized in a first direction angularly offset from the plane in which the shock sensor lies, the first piezoelectric sensor producing a first response to shocks having components along a first and a second orthogonal axis which define a plane perpendicular to the plane in which the shock sensor lies;

a second piezoelectric sensor polarized in a second direction angularly offset from the plane in which the shock sensor lies, the second direction angularly offset 180° from the first direction, the second piezoelectric sensor producing a second response to shocks having components along the first and second orthogonal axis; and, an integrated circuit responsive to said first response and said second response and operative to produce;
 a first signal indicating a linear shock to the first piezoelectric sensor;
 a second signal indicating a linear shock to the second piezoelectric sensor; and,
 a third signal indicating a rotational shock to the shock sensor generated by combining an output of the first piezoelectric sensor and an output of the second piezoelectric sensor.

2. The shock sensor of claim 1 wherein said first direction is angularly offset from said plane in which the shock sensor lies by about 25°.

3. The shock sensor of claim 1 further comprising a package, wherein the first piezoelectric sensor, the second piezoelectric sensor and the integrated circuit are disposed within the package.

4. The shock sensor of claim 1 wherein said first piezoelectric sensor is a piezoelectric ceramic.

5. The shock sensor of claim 1 wherein said first piezoelectric sensor is a shear mode sensor.

6. The shock sensor of claim 1 wherein said first piezoelectric sensor is a compression mode sensor.

7. The shock sensor of claim 1 wherein said first piezoelectric sensor is a beam-type sensor.

8. The shock sensor of claim 1 wherein said second piezoelectric sensor is a piezoelectric ceramic.

9. The shock sensor of claim 1 wherein said second piezoelectric sensor is a shear mode sensor.

10. The shock sensor of claim 1 wherein said second piezoelectric sensor is a compression mode sensor.

11. The shock sensor of claim 1 wherein said second piezoelectric sensor is a beam-type sensor.

12. The shock sensor of claim 3 wherein said package comprises a ceramic leaded package.

13. The shock sensor of claim 3 wherein said package comprises a ballgrid package.

14. The shock sensor of claim 3 wherein said package comprises a plastic package.

15. The shock sensor of claim 1 operative to detect shocks to a hard disk drive.

16. The shock sensor of claim 1 wherein said first signal, said second signal and said third signal are analog signals.

17. The shock sensor of claim 1 wherein said first signal, said second signal and said third signal are digital signals.

18. The shock sensor of claim 1 wherein said first signal, said second signal and said third signal are a combination of analog and digital signals.

19. A method of sensing a shock comprising:

generating a first signal capable of indicating a shock along two orthogonal axes using a first piezoelectric sensor having a first primary axis in a first direction;

generating a second signal capable of indicating a shock along the two orthogonal axes using a second piezoelectric sensor having a second primary axis in a second direction angularly offset 180° from said first direction;

generating a first output signal representative of a linear shock along the two orthogonal axes in response to the first signal; and, generating a second output signal representative of a rotational shock in a plane perpendicular to a plane defined by the two orthogonal axes by combining the first signal and the second signal.

20. The method of claim 19 wherein:

said first piezoelectric sensor lies generally within a first plane and the first primary axis lies in a second plane perpendicular to the first plane; and, said second piezoelectric sensor lies generally within the first plane and the second primary axis lies in a third plane perpendicular to the first plane and parallel to the second plane.

21. The method of claim 20 wherein the first primary axis is angularly offset about 25° from said first plane.

22. The method of claim 20 wherein the second primary axis is angularly offset about 25° from said first plane.

23. A hard disk drive for a computer including a shock sensor as claimed in claim 1.

* * * * *